W. A. TURBAYNE.
REGULATOR FOR ELECTRIC GENERATORS.
APPLICATION FILED APR. 17, 1914.
1,356,099.
Patented Oct. 19, 1920.
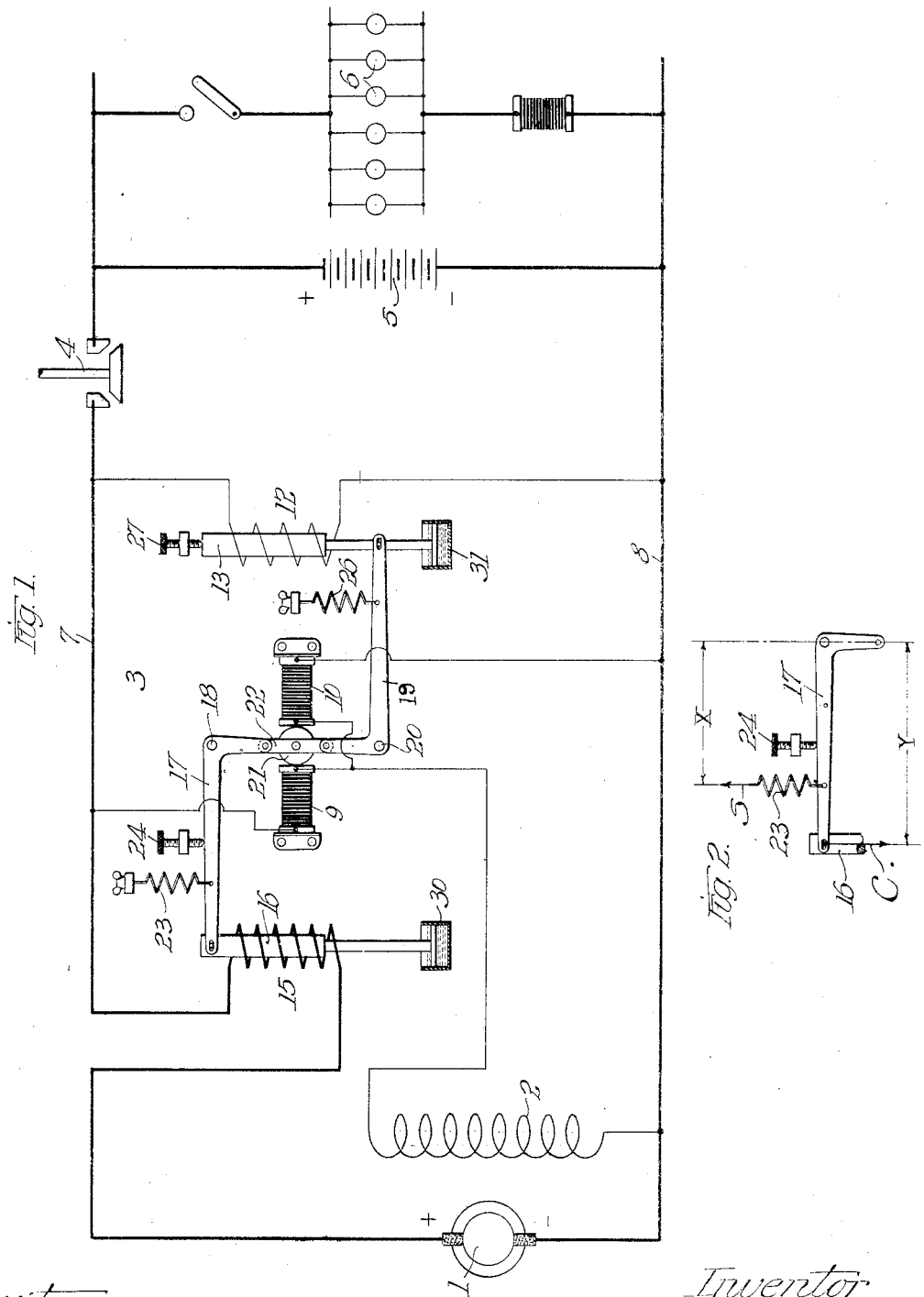

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

REGULATOR FOR ELECTRIC GENERATORS.

1,356,099.      Specification of Letters Patent.      Patented Oct. 19, 1920.

Application filed April 17, 1914. Serial No. 832,504.

*To all whom it may concern:*

Be it known that I, WILLIAM A. TURBAYNE, a citizen of the United States, residing at Niagara Falls, in the county of Niagara and State of New York, have invented new and useful Improvements in Regulators for Electric Generators, of which the following is a full, clear, concise, and exact description, reference being had to the accompanying drawing, forming a part of this specification.

This invention relates to regulators for electric generators.

The invention is especially applicable to the regulation of variable speed battery charging generators such as are employed in railway car lighting and automobile starting and lighting systems, although the invention is not limited to such application and may be employed in other relations and under other conditions.

One object of the invention is to provide an improved regulator which is subject to control in accordance with current in the system until predetermined circuit conditions are attained and which is then subject to control in accordance with voltage conditions.

Another object is to provide an improved and simplified regulator which will not interfere with building up of the voltage of the generator and which will cause a maximum current output at relatively low speeds and will prevent excessive current output at high speeds and which is capable of accurate adjustment.

A still further object is to provide a regulator actuated by a solenoid which will be operative only after a predetermined value of current passes through said solenoid.

Figure 1 is a diagram of the system embodying my invention.

Fig. 2 is a fragmentary detail.

In charging storage batteries by a variable speed generator it is desirable to have the generator build up to the proper voltage quickly in order to allow charging at relatively low speeds. A regulator is necessary to prevent excessive voltage and current at high speeds. I have found that in many regulators heretofore constructed the voltage or current begins to operate the regulator before the generator has come to the proper voltage. This interferes with the prompt building up of the voltage and prevents maximum charging current at lower speeds. This action occurs because the force of attraction of the regulator magnet upon its armature or core begins as soon as current flows through the regulating winding. According to this invention the earlier regulation action of the magnets is not permitted and the generator is caused to build up its voltage quickly. The regulator resistance is placed under the control of an independent force external to the regulator winding or its adjuncts. This force which may be accurately predetermined must first be overcome before the regulator winding can assume control. The value of this external force may be and preferably is so predetermined that the transfer of control to the regulator winding occurs at maximum current output in case the regulator is current controlled.

The system shown in Fig. 1 comprises a generator having an armature 1 and a shunt winding 2, a regulator 3, an automatic switch 4 and storage battery 5 and lamps 6 connected to the generator by the mains 7 and 8. The regulator 3 comprises two carbon pile rheostats 9 and 10. The rheostat 10 is in shunt of the generator winding 2 and the other rheostat 9 is in series with the winding 2 and the rheostat 10. Solenoids 12 and 15 are arranged to vary the resistance of these rheostats by changing the pressure upon them. The rheostat 12 is controlled by a winding which is connected in shunt of the mains 7 and 8. The solenoid 15 has a series winding which is connected in series with the main 7. The two carbon pile rheostats 9 and 10 are placed substantially end to end and between them is placed a roller 21. This roller is mounted on a link 22 which is movable by either one or both of the bell crank levers 17—19 pivoted at points 18 and 20 respectively. The bell crank lever 17 is connected to the core 16 of solenoid 15 and the bell crank lever 19 is connected to the core 13 of solenoid 12. A spring 23 normally holds the bell crank lever and the core 16 at the upper end of the stroke and in engagement with a stop 24. This stop may be adjusted as may also the tension of the spring 23 to bring the lever 17 to the intial position. In a similar manner the bell crank lever 19 is held by the tension of spring 26 and is limited in its movement by the stop 27, which is also adjustable.

In the position shown in Fig. 1 a movement of the lever 17 against the tension of the spring 23 will move the link 22 about its lower end as a pivot and will relax the pressure on the rheostat 9 and increase the pressure on rheostat 10. In the same manner movement of the bell crank lever 19 against the tension of the spring 26 will move the link about its upper end as a pivot to shift the roller 21 to the right. Thus the link 22 may pivot about either of its extremities on the end of the corresponding bell crank lever to produce movement of the roller 21. When thus swung about its end the link operates as a second class lever and a powerful compound leverage is thereby produced. Simultaneous movement of the arms 17 and 19 would produce a motion of translation in the link 22 giving thus a cumulative effect.

The operation of the system is as follows,—when the system is at rest the parts are in the position shown in Fig. 1. Rotation of the armature 1 builds up the voltage of the generator. Under the influence of the springs 23 and 26 the link 22 is held in such a position as to exert a maximum pressure on the rheostat 9 and the minimum pressure on the rheostat 10. As a consequence, very little current flows through the rheostat 10 and the machine builds up as a shunt wound generator. The current flowing through the solenoid 15, rheostat 9 and shunt field 2 causes a pull upon the solenoid core 16 but this is insufficient to overcome the pull of the spring 23 and it holds the bell crank lever 17 against the stop 24. When the proper voltage has been attained the automatic switch 4 closes the main circuit and allows the battery 5 to be charged by the generator. The voltage at this time is insufficient to cause any regulating effect in the solenoid 12 as the pull of the solenoid is insufficient to overcome the tension of the spring 26 and the lever 19 remains stationary under the influence of the spring 26 and the stop 27.

As soon as the automatic switch 4 closes, current flows through the winding of the solenoid 15 and exerts a stronger pull on the core 16. The tension of the spring 23 has been adjusted to such a value that the lever 17 will not be released from the stop 24 until the maximum permissible current is flowing through the solenoid. In this manner a very quick building up of the voltage of the machine is allowed and regulating action does not begin until the same is necessary. Any tendency of increase of current flowing through the solenoid 15 causes a downward movement of the plunger 16 against the tension of the spring 23 which has now been overcome to such an extent as to disengage the bell crank lever from the stop 24. Movement of the bell crank lever is transmitted to the link 22 to cause the roller 21 to relax pressure on the rheostat 9 and to increase pressure on the rheostat 10. In this manner the excitation current through the winding 2 is cut down both by the increase of resistance in the series rheostat 9 and by the lowering resistance of the shunt rheostat 10 which latter action causes a partial short-circuit around the winding 2. As above explained, the solenoid 12 is inoperative at this time to cause any regulating action as the voltage across the mains is insufficient to cause enough current to flow through the winding of the solenoid to overcome the tension of the spring 26. The solenoid 15 operates at this time to govern the voltage of the generator under various speeds of the armature 1.

As the charge of the battery nears completion the electro-motive force of the battery rises and the consequent tendency is to cause more current to flow through the shunt solenoid 12. The tension of the spring 26 is so adjusted that when a predetermined voltage of the system is reached the voltage across the terminals of the solenoid 12 will force enough current through the winding to overcome the resistance of the spring 26, and the shunt solenoid 12 will operate to regulate the exciting current through generator field winding 2. The voltage across the mains is thus held at the constant value for which the regulator has been set. Any tendency toward increased voltage will send more current through the solenoid 12 and this will in turn tend to draw the core 13 downward against the tension of the spring 26. This movement of the core is transmitted to the bell crank lever 19, which, through the link 22 and the roller 21, increases the resistance of the rheostat 9 and decreases the resistance of rheostat 10 to cut down the excitation and thereby to reduce the voltage across the mains. This regulating action of the solenoid 12 reduces the current flowing through the solenoid 15 and when the voltage of the storage battery has risen to a higher amount the current will be so reduced that the pull upon the core 16 of the solenoid 15 will be insufficient to overcome the tension of the spring 23 and the bell crank lever will be moved against the stop 24 and held in fixed position. Regulation is thereafter effected solely by the shunt solenoid 12.

If the speed of the armature 1 dies down the voltage will be insufficient to cause the coil 12 to overcome the tension of the spring 26 and the spring will hold the parts against the fixed stop 27. A further decrease in speed will allow the automatic switch 4 to open and the system comes to rest in the position shown in Fig. 1.

The position of the fixed stops 24 and 27 is immaterial as their function is merely to serve as a means to stop the movement of the bell crank levers and connected parts, in one direction, the purpose of the adjustable thumb screws 24 and 27 being to secure a proper initial position and to throw a certain part of the tension of the springs 23 and 26 upon the carbon pile rheostat 9, the rest of the tension being taken up by the stops themselves. The tension of the springs 23 and 26 may be adjusted to any desired value to place the connected levers under an initial tension which must be overcome by the respective solenoids before any regulating action can be accomplished by them. It is by the tension placed upon the springs that the effect of small values of current and voltage is prevented from interfering with the proper building up of the voltage of the machine. Other equivalent means may be devised for placing the parts 17 and 19 under an initial tension which must be overcome before the respective parts can be moved.

Fig. 2 illustrates the relative effect of the spring initially under tension and the pull in the solenoid core. To free the arm 17 from the stop 24 it is necessary that a certain definite pull must act upon core 16 before the lever 17 will be moved away from the stop 24 to effect regulation. The value at which this will occur depends upon the force of the tension in the spring 23 which may be represented by the arrow S. This force operates through the lever arm of a length X. The pull exerted on the core 16 may be represented by the arrow C and the lever arm through which it operates by the length Y. These lengths X and Y may be varied as preferred. The position of the stop 24 is immaterial in this connection.

By the above construction a regulator of great simplicity is provided. The solenoids may be made very sensitive throughout their range of action but will not interfere with the building up of the machine during which stage of the operation no regulation is needed. The regulator is placed first solely under the control of the series solenoid to be operated in accordance with the current. When the charge of the battery is approximately completed the solenoid 12 assumes the control of the regulator to hold the voltage of the generator at such a value that a very slight current passes through the battery 5. If desired, the regulator may be adjusted to float the battery across the line and to stop the charging of the battery completely while allowing current to be furnished to the lamps 6 or other translating devices.

Although the invention has been described in connection with a particular embodiment and with reference to certain details of construction the invention is not limited to the particular embodiment nor to any of the details thereof except as the same are positively stated in the claims.

What I claim as new and desire to secure by Letters Patent of the United States is:—

1. A variable resistance regulator including two compressible rheostats placed end to end in alinement, means between the adjacent ends of said rheostats for simultaneously varying the compression thereof, said means including a link and separate levers pivotally connected to the opposite ends of said link, whereby movement of either lever may cause said link to move about its pivotal attachment to the other lever to vary said compression.

2. A variable resistance regulator including two compressible rheostats placed end to end in alinement, means between the adjacent ends of said rheostats for simultaneously varying the compression thereof, said means including a link and separate levers pivotally connected to the opposite ends of said link, whereby movement of either lever may cause said link to move about its pivotal attachment to the other lever to vary said compression, and independent electromagnetic means for moving said levers.

In witness whereof, I have hereunto subscribed my name in the presence of two witnesses.

WILLIAM A. TURBAYNE.

Witnesses:
 FRANK ENGEL,
 J. O. CANNON.